US008583582B2

(12) United States Patent
Hasan et al.

(10) Patent No.: US 8,583,582 B2
(45) Date of Patent: Nov. 12, 2013

(54) ROBUST AUTOMATED HIERARCHICAL DETERMINATION FOR POWER MONITORING SYSTEMS (75) Inventors: Amjad Hasan, Murfreesboro, TN (US); Ronald W. Carter, Russellville, AR (US); Jon A. Bickel, Murfreesboro, TN (US)

(73) Assignee: Schneider Electric USA, Inc., Palatine, IL (US)

( * ) Notice: Subject to any disclaimer, the term of this patent is extended or adjusted under 35 U.S.C. 154(b) by 960 days.

(21) Appl. No.: 12/695,237

(22) Filed: Jan. 28, 2010

(65) Prior Publication Data

US 2011/0184576 A1 Jul. 28, 2011

(51) Int. Cl.
G06N 7/02 (2006.01)
G06N 5/04 (2006.01)

(52) U.S. Cl.
CPC ....................................... *G06N 5/048* (2013.01)
USPC ........................................................... 706/52

(58) Field of Classification Search
USPC .................................. 706/52, 900, FOR. 121
See application file for complete search history.

(56) References Cited

U.S. PATENT DOCUMENTS

| 5,920,852 | A | 7/1999 | Graupe |
| 6,016,465 | A | 1/2000 | Kelly |
| 6,088,659 | A | 7/2000 | Kelley et al. |
| 6,094,650 | A | 7/2000 | Stoffel et al. |
| 7,079,984 | B2 | 7/2006 | Eryurek et al. |
| 7,272,518 | B2 | 9/2007 | Bickel et al. |
| 2003/0222509 | A1 | 12/2003 | Andarawis et al. |
| 2004/0225649 | A1 | 11/2004 | Yeo et al. |
| 2005/0050095 | A1 | 3/2005 | Hurtis et al. |
| 2005/0197806 | A1 | 9/2005 | Eryurek et al. |
| 2007/0005275 | A1 | 1/2007 | Bickel et al. |
| 2007/0014313 | A1 | 1/2007 | Bickel et al. |

FOREIGN PATENT DOCUMENTS

| WO | 00/65480 A2 | 11/2000 |
| WO | 2005/059572 A1 | 6/2005 |
| WO | 2007/027086 A1 | 3/2007 |
| WO | 2007/032944 A2 | 3/2007 |
| WO | 2009/061291 A1 | 5/2009 |

OTHER PUBLICATIONS

Article: Cross Correlation—Auto Correlation- 2D Pattern Identification by Paul Bourke (Aug. 1996) 11 pages.
Article: The need for Speed by Richard P. Bingham, Dranetz—BMI (dated Nov. 1999) 12 pages.

(Continued)

*Primary Examiner* — Jeffrey A Gaffin
*Assistant Examiner* — Stanley K Hill (57) ABSTRACT An automated hierarchy classification algorithm that searches for a child monitoring device's parent in a utility monitoring system by segmenting the device data measured by a given device pair and calculating a segment correlation coefficient for each data segment. Devices to be placed in the hierarchy are filtered by calculating the variance of their device data and eliminating devices with a low variance. Devices are ranked by computing the sum of squares of their device data and ordering the devices accordingly from highest to lowest. The device data is segmented and segment correlation coefficients are averaged to produce an overall correlation coefficient. Criteria are evaluated to determine whether a device pair is linked. A correlation coefficient is calculated using the complete data series of a device pair, and the solution produced by this approach is compared with the solution produced by segmenting the device data. If the solutions disagree, a likely candidate is determined from a fuzzy logic module.

20 Claims, 5 Drawing Sheets (56) References Cited

OTHER PUBLICATIONS

Article: GPS World—Pacify the Power GPS Harness for Large—Are Electrical Grid by Dennis Erickson and Carson Taylor (Apr. 1, 2005) 9 pages.

Article: Innovation to Reality—Introducing State-of-the-Art Protection and Monitoring to Existing Low-Voltage Switchgear ©2005, IEEE; 11 pages.

Article: "Entellisys™ Low-Voltage Switchgear," GE Consumer & Industrial Electrical Distribution; dated 2005; 17 pages.

PCT Written Opinion for International Application No. PCT/US2006/025444, European Patent Office, dated Oct. 10, 2006 (9 pages).

PCT Search Report for International Application No. PCT/US2006/025444, European Patent Office, dated Oct. 10, 2006 (6 pages).

Ren C. Luo et al., "Automated Decision Tree Generation for Object Recognition and Classification" Proceedings of the International Conference on Industrial Electronics, Control and Instrumentation (IECON). Industrial Applications of Mini, Micro and Personal Computers, Document No. XP-0020568809, dated Sep. 29, 1986 pp. 357-362.

Article: Protection, Control, Reliability and Diagnostic Improvements via Single-Processor Control of Circuit Breakers in Low Voltage Switchgear ©2005, IEEE; 10 pages.

PCT Written Opinion for International Application No. PCT/US2007/023236, European Patent Office, dated Feb. 5, 2009 (7 pages).

PCT Search Report for International Application No. PCT/US2007/023236, European Patent Office, dated Feb. 5, 2009 (5 pages).

Written Opinion corresponding to International Patent Application No. PCT/US2011/022490, European Patent Office, dated Apr. 18, 2011, 7 pages.

International Search Report corresponding to International Patent Application No. PCT/US2011/022490, European Patent Office, dated Apr. 18, 2011, 5 pages.

FIG. 1  UTILITY MONITORING SYSTEM

ROBUST AUTOMATED HIERARCHICAL DETERMINATION FOR POWER MONITORING SYSTEMS

FIELD OF THE INVENTION

The present disclosure relates generally to methods and systems for automatically determining how monitoring devices are linked together in a utility monitoring system.

BACKGROUND

The ability to automatically determine the hierarchy of a utility monitoring system is important to the next generation of energy solutions. It is useful not only for producing one-line diagrams of how monitoring devices in the utility monitoring systems are spatially related in a hierarchical arrangement, but those one-line diagrams provide a spatial context to the data taken from all capable monitoring devices.

U.S. Pat. No. 7,272,518, entitled "Automated Hierarchy Classification In Utility Monitoring Systems," discloses an "auto-learned hierarchy algorithm," which automatically determines how monitoring devices are arranged in a utility monitoring system. This auto-learned hierarchy algorithm works well for utility monitoring systems in which all or most of the loads are being monitored by a monitoring device and the loads being monitored in the utility monitoring system experience a range of variations in the characteristic being monitored (such as power). This is because the auto-learned hierarchy algorithm exploits a correlation algorithm for correlating monitored data sets for any given pair of monitoring devices. The greater the range in variations seen in the monitored device data, the easier it is to determine whether a pair of devices correlates with one another and are determined to be linked in the monitoring system.

However, some utility monitoring system configurations can include loads that do not experience significant variations in their monitored characteristic (such as the rate of energy consumption when the utility monitoring system is a power monitoring system), or include large unmetered loads in the hierarchy that have a significant impact on the associated parent devices (if any). Placing monitoring devices into the hierarchical layout of such system configurations is generally more challenging. Moreover, variations in the monitoring devices themselves, which can be of different types and made by different manufacturers, render the hierarchical determination more complex because different devices can have different levels of accuracy of measurement.

For example, suppose a load consumes 1000 kW of power, but only 10 kW of that power is being monitored by a power meter in the power monitoring system. 990 kW of the power consumed by the load is unmonitored. Power data between a power meter monitoring that load and its parent are weakly correlated because the 10 kW power contribution is dwarfed by the large unmetered 990 kW load.

BRIEF SUMMARY

This hierarchy classification algorithms disclosed herein are accurate and provide robust performance and efficiency. The auto-learned hierarchy algorithms disclosed in U.S. Pat. No. 7,272,518 and the hierarchy classification algorithms disclosed in the present disclosure are both based on correlating data indicative of a utility characteristic measured by monitoring devices in a utility monitoring system; however, empirical data has shown that various trends can concurrently exist within the same data set. In "open" monitoring systems (i.e, systems that have a lot of unmonitored loads), these concurrent trends can be difficult to spot. The algorithms disclosed herein segment the device data in such a way that additional trends are filtered and the primary trend of interest is evident. The sequence of the devices to be analyzed has also been modified based on their real power value, resulting in an improvement of the algorithm's execution. Finally, a fuzzy logic module has been employed on device data to provide a confidence level for discrete nodes within the hierarchical solution.

A difference between the auto-learned hierarchy algorithms disclosed in U.S. Pat. No. 7,272,518 (hereafter the "original" algorithms) and the hierarchy classification algorithms in the present disclosure includes the sequence in which the hierarchy is constructed. The original algorithms selected a parent as a reference device and searched for its children. The hierarchy classification algorithms disclosed herein (which include both segmented and bulk approaches as described below) invert that paradigm, by first selecting a child as a reference device and searching for its parent. A filter is also applied to weed out monitoring devices whose loads are not sufficiently fluctuating or experiencing a satisfactory enough level of variations in the measured characteristic to be accurately placed within the hierarchy using the hierarchy classification algorithms disclosed herein. By weeding out devices with relatively static characteristics of significance, the robustness of the algorithm is improved because the number of potentially errant links in the hierarchy is reduced.

Before searching for links, the devices are ranked in an ordered manner according to the sum of squares of their device data. The sum of squares gives weight to negative values that can be significantly correlated with the same corresponding negative values measured by linked monitoring devices. By ranking the devices before searching for links among the device pair combinations, the algorithm can rapidly build the hierarchy by starting with the highest ranked children and linking level-by-level, each child with its parent, which will always have a higher rank than the child device under consideration. There is no need to correlate any devices having a lower rank than the reference device, because the algorithm searches for the parent of the child device, and the parents are presumed to have a higher rank (e.g., exhibit a higher rate of energy consumption in the power monitoring system) than linked child devices lower in the hierarchy.

Additionally, the hierarchy classification algorithms disclosed herein segment the time-series device data for each device in the device pair into corresponding multiple data segments, and calculates multiple segment correlation coefficients on a data-segment by data-segment basis to produce as many segment correlation coefficients as there are data segments. These segment correlations are averaged together to produce an overall segmented correlation coefficient. This approach is referred to as the segmented approach.

Finally, aspects of the original algorithms are still exploited herein to determine a solution, but when the solution provided by the original algorithms and the solution provided by the segmented approach disclosed herein disagree, a fuzzy logic module determines which one of the conflicting parent candidates is linked to the reference child device under consideration.

The foregoing and additional aspects and implementations of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Figure 1:
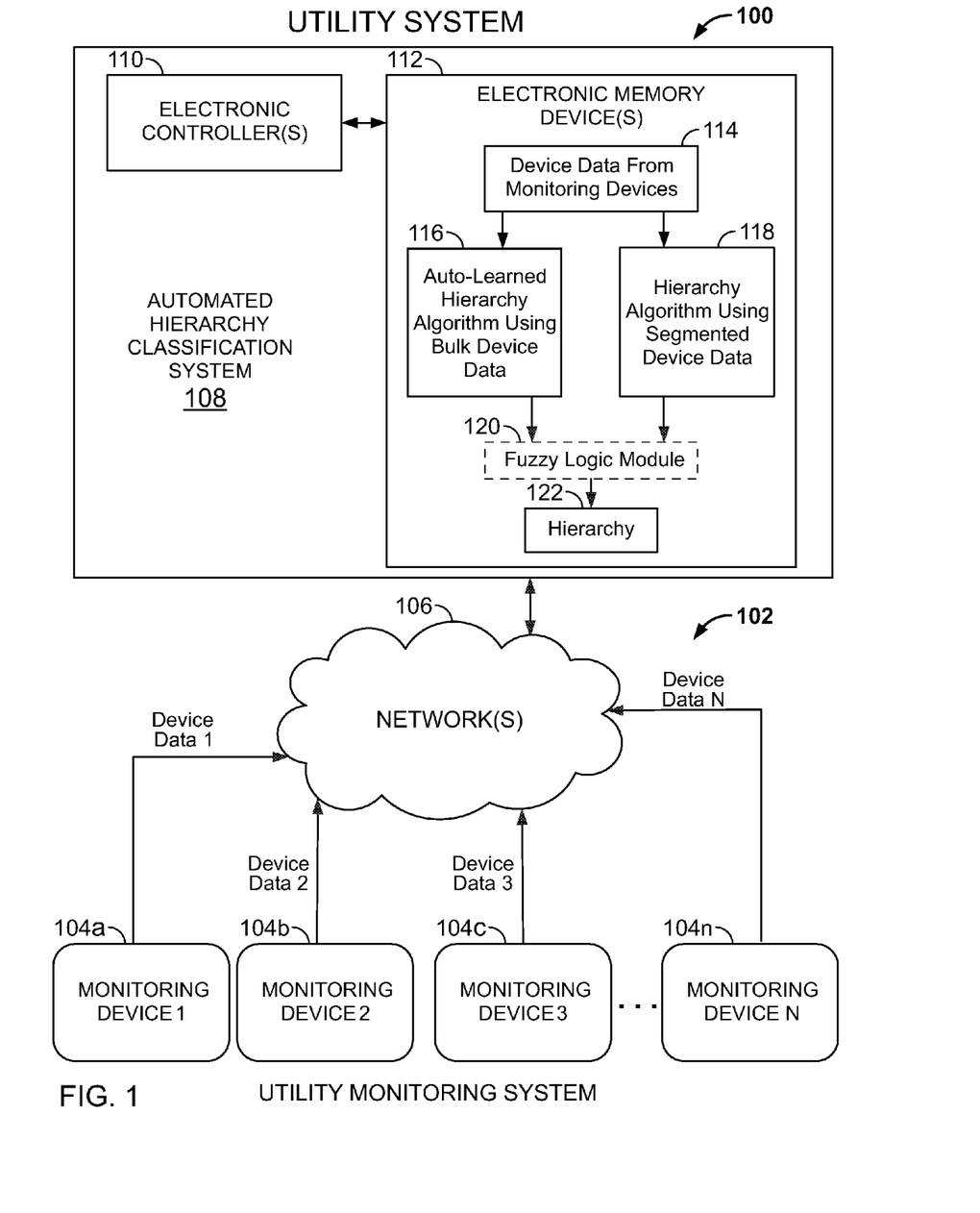
FIG. 1 is a functional block diagram of an example utility system including an automated hierarchy classification system according to an implementation of the present disclosure.

Referring now to FIG. 1, a functional block diagram of an exemplary utility system 100 is shown. The utility system is a system that receives or provides a utility, which can be any of the utilities denoted by the acronym WAGES: water, air, gas, electricity, or steam. For purposes of this disclosure, the utility electricity will be assumed, but it should be understood that the aspects of the present disclosure discussed herein are equally applicable to any of the other utilities. Each utility has one or more characteristics, which in the example of electricity, include such characteristics as power, voltage, current, current distortion, voltage distortion, voltage unbalance, or energy, to name just a few. The characteristics can be quantified by values, such as those expressed in amps, volts, watts, or watt-hours, in the case of current, voltage, power, or energy, respectively. The utility system 100 includes a utility monitoring system 102, which is a system that monitors measurable and quantifiable characteristics of any of the WAGES utilities mentioned above, via one or more monitoring devices 104a,b,c,n, where the monitoring device 104n represents the Nth monitoring device in a monitoring system that includes a total number of N monitoring devices, which can be in the hundreds or even thousands for large utility monitoring systems. In the example discussed herein, the utility monitoring system 102 is a power monitoring system, but the utility monitoring system 102 can be any other monitoring system that monitors any of the WAGES utilities mentioned above.

Each of the monitoring devices 104a,b,c,n measures, senses, or detects a quantifiable characteristic (such as power, voltage, current, current distortion, voltage distortion, voltage or current unbalance, or energy) of a utility (in this example, electricity) for a predetermined period of time, such as an hour or other period of time, and stores on a conventional memory device on the monitoring device (not shown) device data that includes values (such as amps or volts values) that are indicative of the current or voltage measured by the monitoring device 104 and an indication of the order (e.g., a timestamp or a counter) in which the device data was captured by the corresponding monitoring device. Monitoring devices can include, for example, meters, intelligent electronic devices (IEDs), or other apparatuses capable of quantifying and storing measured utility characteristics or parameters. The entire set of device data is referred to as the "bulk" data, and this device data can be broken up or partitioned into smaller data segments (for example, an hour's worth of device data can be segmented into 60 data segments containing one minute of measured data). As used herein, the reference number 104 refers to any of the monitoring devices 104a,b,c,n. As shown in FIG. 1, each of the monitoring devices 104 includes a conventional communications interface (not shown) for communicating their respective device data to one or more networks 106, which is communicatively and operatively coupled to an automated hierarchy classification system 108. An example automated hierarchy classification system is disclosed in commonly assigned U.S. Pat. No. 7,272,518, entitled "Automated Hierarchy Classification In Utility Monitoring Systems." This patent refers to an "auto-learned hierarchy algorithm," and that term in the present disclosure refers to the same algorithm disclosed in this patent. A difference in the auto-learned hierarchy algorithm of the present disclosure versus that disclosed in U.S. Pat. No. 7,272,518 is that the auto-learned hierarchy algorithm of the present disclosure selects a reference monitoring device and searches for its parent monitoring device instead of its children. This methodology is described in connection with the segmented approach below.

The automated hierarchy classification system 108 includes one or more electronic controllers 110 coupled to one or more electronic memory devices 112. The one or more controllers 110 receives the respective device time-series data from each of the monitoring devices 104 via the one or more networks 106, and stores the device data in the one or more memory devices 112. The one or more controllers can be microprocessors, microcontrollers, or the like, and can be distributed across multiple devices or systems and communicatively and operatively coupled to one another Likewise, the one or more memory devices can be RAM, flash memory, VRAM, mass storage devices such as hard drives, flash drives, or the like, and can be distributed across multiple devices or systems and operatively coupled to one another.

The one or more memory devices 112 include the following information stored thereon: device data 114 from the monitoring devices 104; an auto-learned hierarchy algorithm 116 using bulk device data that is based on the auto-learned hierarchy algorithm disclosed in U.S. Pat. No. 7,272,518; a hierarchy algorithm 118 using segmented device data as disclosed in the present disclosure; an optional fuzzy logic module 120, and a representation of a hierarchy 122 of the monitoring devices 104 in the utility monitoring system 102. The hierarchy 122 is a multi-level representation of the connection layout of the monitoring devices 104 within the utility monitoring system 102, and how the monitoring devices 104 are interlinked with each other, either directly, indirectly, or not linked at all, within a spatial context. At the highest level of the hierarchy, the top-most monitoring device does not have any parent, and is thus termed an orphan. Any monitoring device that does not have a parent or for which a parent cannot be determined is termed an orphan in this disclosure. Every other monitoring device in the hierarchy that has a parent monitoring device is termed a non-orphaned monitoring device. Any given monitoring device can have a parent monitoring device, and any given parent monitoring device can have more than one child monitoring device. Relationships are determined in the hierarchy based on parent-child relationships, where direct relationships are established by direct parent-child connections in the hierarchy. Monitoring devices on the same level with the same parent are termed siblings. A monitoring device conventionally also includes one or more electronic controllers for carrying out the measurement, storage, and communications functions of the monitoring device.

Two different hierarchy classification schemes are discussed herein. As shown in FIG. 1, the first is called the auto-learned hierarchy algorithm 116 using "bulk" device data. This algorithm 116 is based on the auto-learned hierarchy algorithm disclosed in U.S. Pat. No. 7,272,518 (as discussed above, the algorithm 116 differs from that algorithm in that the algorithm 116 searching methodology involves determining a child's parent rather than a parent's children). By "bulk" data, it is meant that the correlation functions are carried out on the entire time-series data set for a selected sample period for a given device pair. The other algorithm, which is called a hierarchy algorithm 118 using segmented device data, partitions the device data into smaller chunks or segments, and applies a correlation function on a respective segment-by-segment basis for any given device pair under consideration. Thus, if the hierarchy algorithm 118 segments the device data into 100 segments, there will be 100 correlation coefficients calculated, one for each data segment for a given device pair. To differentiate for purposes of clarity, the algorithm 116 can be referred to variously as the "bulk algorithm 116" or more generally as the "bulk approach," whereas the algorithm 118 can be referred to variously as the "segmented algorithm 118" or more generally as the "segmented approach." More details concerning the segmented algorithm 118 are described below in connection with the flowcharts. It has been found that the segmented approach can produce better correlation results for data where short-term variations in the voltage, current, or power, for example, is observed during a small sample period within the device data. The segmented approach also helps to filter underlying long-term correlations, which could adversely affect the determinations by the automated hierarchy classification system 108. Using the bulk approach, the significance of such short-term variations can be masked in the mass of other data surrounding the short-term variation. Using the segmented approach, an arbitrarily occurring variation can produce a more significant correlation coefficient for that particular data segment, and subsequently, the overall correlation coefficient. As described below, the average of all the correlation coefficients for each of the data segments can be used to produce the overall correlation coefficient. Using the bulk approach, the value of the correlation coefficient would tend to be lower even when strongly correlated, short-term variations were observed in the device data. Using the segmented approach, short-term variations in the device data will have a more influential impact on the overall correlation coefficient. Both approaches can be used in the automated hierarchy classification system 108 as disclosed herein as a confidence check against the proposed parent. When the algorithms 116, 118 produce conflicting solutions, the fuzzy logic module 120 can be invoked to provide a singular solution within a range of confidence. Again, it should be emphasized that both the bulk and segmented approaches or algorithms disclosed herein search for the parent monitoring device of any given reference monitoring device rather than its children monitoring devices.

Figure 2A:
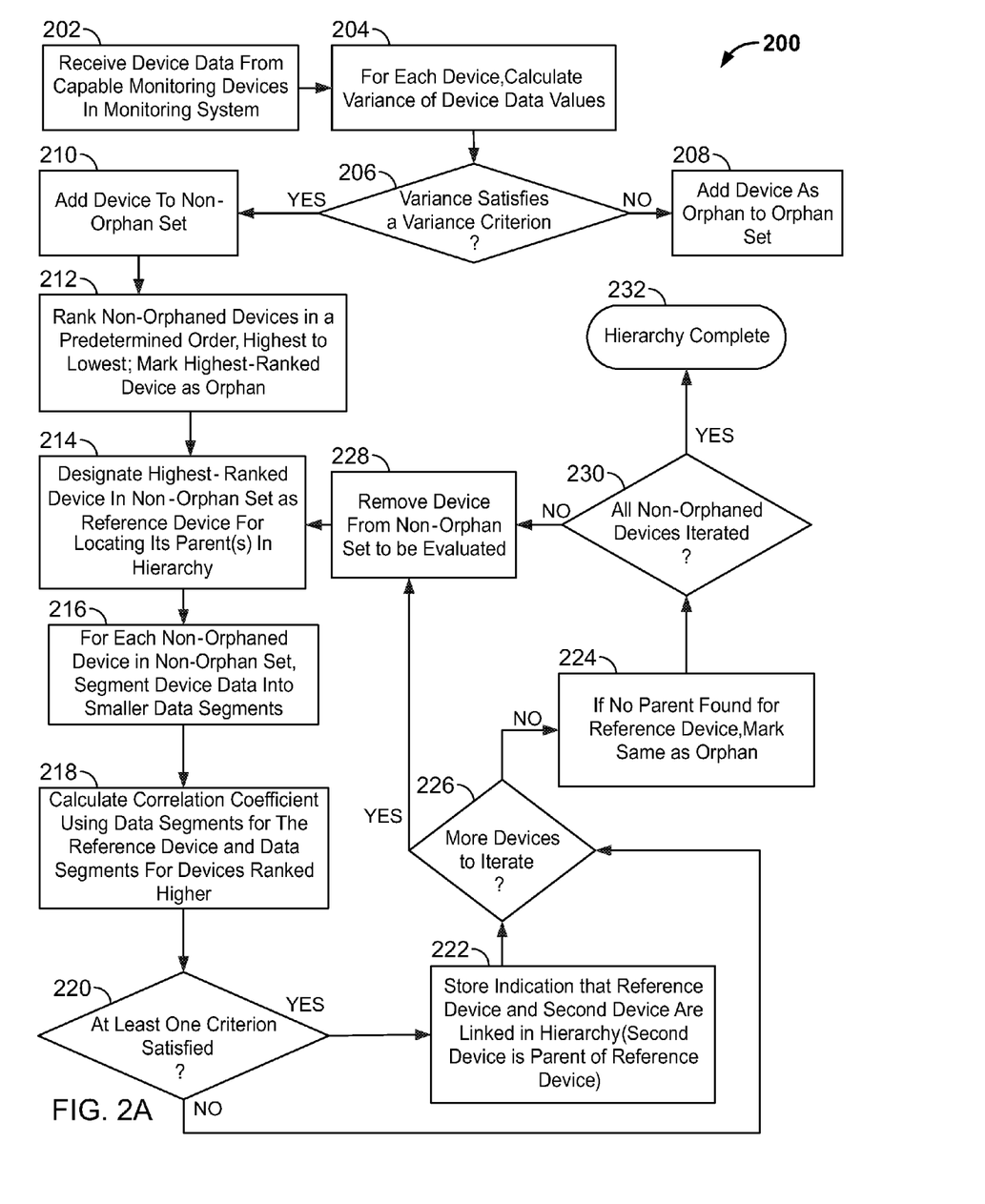
FIG. 2A is a flowchart diagram of an exemplary segmented algorithm for automatically determining how the monitoring devices are linked together in the utility monitoring system of FIG. 1.

FIG. 2A is a flow chart diagram of an exemplary segmented algorithm 200 for automatically determining how the monitoring devices 104 are linked together in the utility monitoring system 102. The one or more controllers 110 receive device data 114 from each of the monitoring devices 104 in the monitoring system 100 (202). The respective device data 114 for each of the monitoring devices is stored in the one or more memory devices 112. For each monitoring device 104, the one or more controllers 110 calculate a variance of the values of the device data for the monitoring device 104 (204). The values are indicative of a characteristic of a utility measured by the corresponding monitoring device 104. The calculated variance quantifies how much variation exists in the device data. The confidence of the solution provided by the hierarchy classification algorithms herein is improved with a greater number of and more changes or variations in the characteristic (such as power) being monitored. The more significant (both numerically and in amplitude) the variations, the better the opportunity to determine the spatial relationship of the monitoring devices 104 in the monitoring system 102. The one or more controllers 110 determine whether the variance satisfies a variance criterion (206). The variance criterion can include whether the variance exceeds a predetermined variance threshold. For example, the predetermined variance threshold can be approximately 2.4 $kW^2$ for a utility monitoring system 102 that monitors power. The predetermined variance can also be determined by a percentage of the maximum calculated variance for the utility monitoring system 102, such as for example, 5%. The predetermined variance threshold is determined based on a desired amount of fluctuations in the characteristic being monitored in the utility monitoring system. As the variance threshold is increased, the confidence level in the hierarchy increases, but at the potential expense of flagging more devices as orphans.

If the variance threshold does not satisfy the variance criterion, the one or more controllers 110 adds the subject monitoring device 104 as an orphan to an orphan set (208). As an orphan, such monitoring devices are deemed to either have no parents or do not experience a sufficient diversity in their device data to confidently determine its spatial relationship within the hierarchy of the utility monitoring system 102. If the variance threshold does satisfy the variance criterion, the monitoring device under consideration does have a sufficient diversity in its device data to attempt to place it within the hierarchy, and it is added to a non-orphaned set of monitoring devices (210).

Figure 2B:
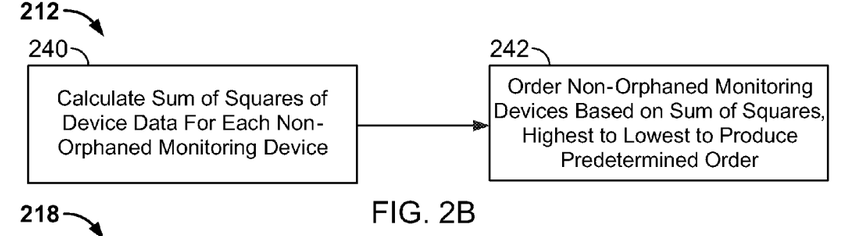
FIG. 2B is a flow chart of an exemplary algorithm for ranking the monitoring devices according to the sum of squares of their respective device data.

Blocks 204-206 are repeated until all of the monitoring devices have been placed into either the orphan set or the non-orphaned set. Once all of the monitoring devices have been categorized as an orphan or a non-orphan, the one or more controllers 110 rank the non-orphaned devices in a predetermined order, for example, from highest to lowest. FIG. 2B illustrates a flow chart of an exemplary algorithm for carrying out the ranking. The one or more controllers 110 calculates a sum of squares of the device data (i.e., summing the square of each value in the device data) for each non-orphaned monitoring device (240). The sum of squares allows the contribution of negative values in the device data to be considered in determining whether the monitoring device in question is a significant consumer of power or energy within the utility system 100. The one or more controllers 110 orders the non-orphaned monitoring devices according to the magnitude of their respective sum of squares value, for example from highest to lowest (242).

Referring back to FIG. 2A, the highest-ranked device is marked as an orphan (212) and placed at the top of the hierarchy because it is measuring the largest quantity of consumption (or production) of the utility being monitored compared to all other monitoring devices in the utility monitoring system 102. Accordingly, the highest-ranked device will not have any parent, so it is marked as an orphan and removed from further consideration by the segmented algorithm 200.

Figure 2C:
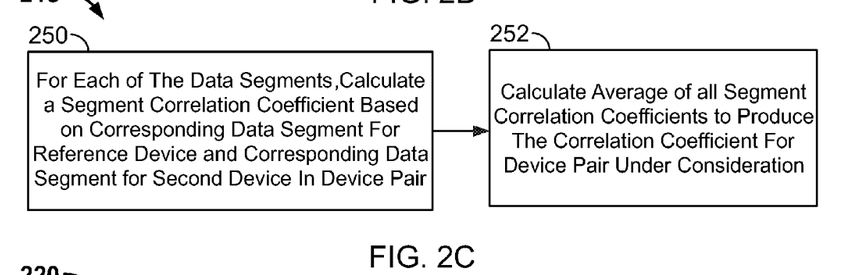
FIG. 2C is a flowchart of an exemplary algorithm for determining a correlation coefficient by calculating the average of the segment correlation coefficients for corresponding data segments associated with a device pair under consideration.

The one or more controllers 110 designate the highest-ranked device in the non-orphaned set as a reference device for locating its parent in the utility monitoring system 102 hierarchy (214). As the reference device, the algorithm 200 searches for its possible parent at a higher level in the utility system's hierarchy. As the term for this segmented algorithm 200 suggests, the algorithm partitions or segments, for each device in the non-orphaned set, the associated device data into multiple data segments, such as, for example, 100 data segments for the entire data set (216). The one or more controllers 110 calculate a correlation coefficient for each data segment for the reference device and each corresponding data segment for monitoring devices ranked higher than the reference monitoring device (218) as determined by the predetermined order at block 212. FIG. 2C is an example flowchart of an algorithm for calculating each discrete correlation coefficient where the data has been segmented. The one or more controllers 110 calculate, for each of the data segments, a segment correlation coefficient based on the corresponding data segment for the reference device and the corresponding data segment for a second device under consideration (250). The second device is a monitoring device that has a higher rank than the reference device as determined at block 212. This calculation yields as many segment correlation coefficients as there are data segments (in this example, there are 100 segment correlation coefficients) for the device pair. The one or more controllers 110 calculate an average of all of the segment correlation coefficients to produce an overall correlation coefficient for the device pair under consideration (i.e., the reference device and a second device whose rank is higher according to the predetermined order determined at block 212). Any suitable correlation algorithm can be employed to calculate a correlation coefficient between two data sets.

It should be noted that the term "second" device is simply to differentiate this device from the first monitoring device. It does not denote any relative importance, order (temporal, spatial, or otherwise), or rank in its use herein. The reference device could be referred to as device X, while the second device could be referred to as device Y, or vice versa.

Figure 2D:
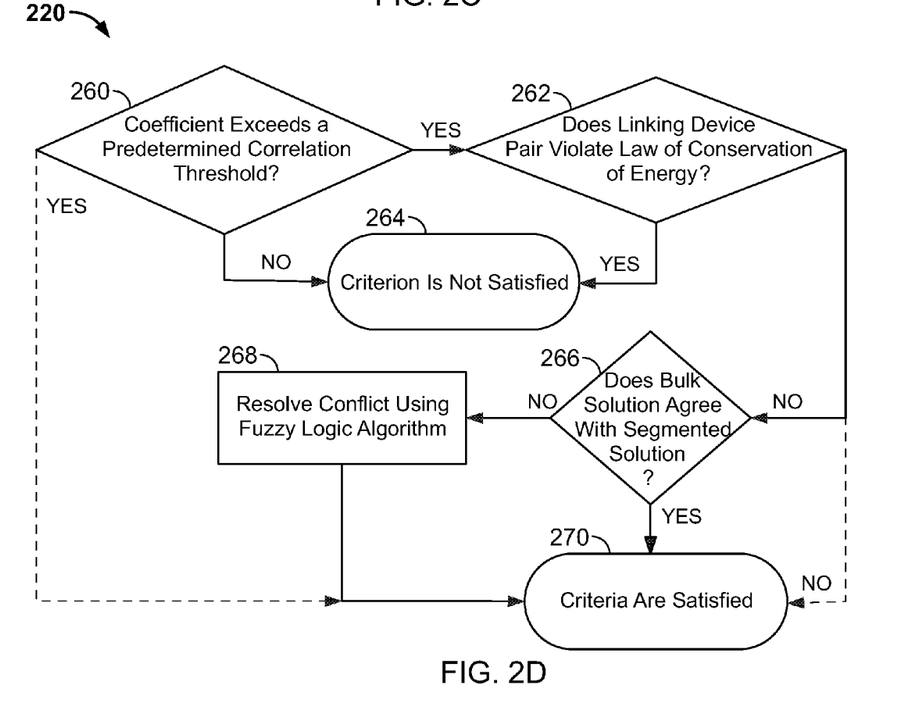
FIG. 2D is a flowchart of an exemplary algorithm for determining whether criteria are satisfied for concluding that a given device pair under consideration are linked in the hierarchy.

The one or more controllers 110 determine whether at least one criterion is satisfied (220). This decision block 220 can determine whether additional criterion or criteria are also satisfied. FIG. 2D is an exemplary flowchart of an algorithm for determining whether one or more criteria have been satisfied to conclude that two devices under consideration (a device pair) are linked in the utility monitoring system 102. The one or more controllers 110 determine whether the correlation coefficient exceeds a predetermined correlation threshold, such as, for example, 0.5, which can be adjusted by an end-user (260). If not, the algorithm 220 determines that the correlation coefficient does not satisfy the criterion, and the segmented algorithm 200 determines that the device pair under consideration are not linked in the utility monitoring system 102 (264). The algorithm 220 can also determine whether additional criteria are satisfied. For example, if the correlation coefficient exceeds the predetermined correlation threshold, the one or more controllers can determine whether linking the second device with the reference device violates the law of conservation of energy or other principles applying to any of the other WAGES utilities (262). It can be assumed that a parent will consume more of a utility than any of its children in a radial-fed utility system. Thus, for example, if the reference device (here, the child device) consumes more power than the second device (its potential parent), such a link would violate the law of conservation of energy, because it is impossible for the child device to consume more power than its parent in a power monitoring system. If linking the device pair under consideration violates the law of conservation of energy or other principles applying to any of the other WAGES utilities, the one or more controllers 110 determines that the correlation coefficient does not satisfy the criterion and concludes that the devices in the device pair are not linked (264).

If the correlation coefficient generated at block 218 exceeds the predetermined correlation threshold (260), and linking the device pair under consideration does not violate a law of conservation of a utility (262), the one or more controllers 110 determine whether the solution provided by the bulk algorithm agrees with the solution provided by the segmented algorithm 200 (266). The bulk algorithm is described as the auto-learned hierarchy algorithm above, and searches for the parent monitoring device linked to the reference monitoring device under consideration. The one or more controllers 110 can run in parallel both algorithms to search for a reference device's most strongly correlated parent (alternatively both algorithms can be run sequentially), but it is possible that the solutions produced by each respective hierarchy classification algorithm will not agree with one another. For example, the segmented approach can determine that a second device is linked to the reference device, but the bulk solution can determine that a third device is also linked to the reference device. Again, the terms "second" and "third" are not intended to imply order or importance of the devices, but rather to differentiate them from one another for ease and clarity of discussion. A reason for the different solutions is that the segmented approach can produce segments that strongly correlate with one another, and these strong correlations will be averaged into the final correlation coefficient and have a stronger influence on the ultimate correlation coefficient that is produced from the average of all of the correlation coefficients computed for each data segment. If the two solutions provided by the bulk and segmented approaches do not agree, the conflict is resolved using a fuzzy logic algorithm 120 (268), such as the one shown in FIG. 4. If the solutions agree, the one or more controllers 110 determine that the criteria (e.g., that the correlation coefficient exceeds a correlation threshold, that linking the device pair does not violate a law of conservation of a utility, and that the bulk and segmented approaches produce the same solution) are satisfied (270).

As described above, any combination of the criteria shown in FIG. 2D can be carried out. For example, once the one or more controllers 110 determine that the correlation coefficient is satisfied, the criterion is deemed to have been satisfied, and the algorithm 200 does not proceed to check whether the law of conservation of energy would be violated or whether the bulk and segmented approaches produce the same solution. Likewise, the algorithm 200 can check whether the law of conservation of energy is violated, but not determine whether the solutions produced by the bulk and segmented approaches agree with one another. These alternate criteria-determining implementations are represented in FIG. 2D by dashed lines.

If the one or more criteria shown in FIG. 2D are satisfied, the algorithm 200 stores an indication in the one or more memory devices 112 that the reference device and the second device are linked in the hierarchy (222). They are linked together such that the second device is a parent of the reference device. The reference device can have at most one parent in the utility monitoring system hierarchy. If any of the criteria shown in FIG. 2D is not satisfied, the one or more controllers 110 determine whether there are additional monitoring devices having a higher rank than that of the reference monitoring device still to be evaluated (226). In other words, the algorithm 200 determines whether there is another potential parent monitoring device to the reference monitoring device. If there are more devices to iterate (226), the one or more controllers can optionally remove the second device from the non-orphaned set to be evaluated (228). For example, if the utility is electricity, and the characteristic being monitored is power, the power measured by the reference (child) device can optionally be subtracted from the second (parent) device. A difference between the segmented approach and the original auto-learned hierarchy algorithms is that the original algorithms described in U.S. Pat. No. 7,272,518 can be viewed as a "child-search" approach, whereby the hierarchy is constructed from the top-most feeder level down to the lower-level feeders and finally to the devices monitoring the loads in the utility monitoring system. Thus, for any given reference monitoring device, the auto-learned hierarchy algorithm attempts to find its respective children. By contrast, the bulk and segmented approaches can be viewed as a "parent-search" approach, whereby the utility monitoring system's hierarchy is constructed by locating the parent for any given reference device at any given feeder level or level in the hierarchy, proceeding to find the parent of any given device located at any given feeder or level. The segmented and bulk approaches disclosed herein still begin to build the hierarchy by starting with the highest ranked device, but build the hierarchy by searching for the parent of a given reference monitoring device rather than its children. If the second monitoring device was found to be linked to the reference monitoring device, the second monitoring device is removed from the non-orphaned set and indicated as being linked to the reference monitoring device (222). It should be emphasized that the bulk approach herein differs from the auto-learned hierarchy algorithm disclosed in U.S. Pat. No. 7,272,518, in that the bulk approach (block 118 in FIG. 1, block 266 in FIG. 2D, and block 316 in FIG. 3) herein searches for the parent of a given reference monitoring device instead of for its children as disclosed in U.S. Pat. No. 7,272,518.

Once the characteristic monitored by the reference monitoring device for the iteration under consideration is optionally subtracted from the characteristic monitored by the second monitoring device, the algorithm 200 continues to evaluate the next highest-ranked device that has a rank higher than the current reference monitoring device under consideration. If there are no such higher-ranked devices to iterate, the algorithm 200 proceeds to evaluate the next reference monitoring device in the hierarchy based on the predetermined order produced at block 212 with the next remaining device in the non-orphaned set (214).

Returning to block 226, if no parent was found for the reference monitoring device under consideration, the one or more controllers 110 mark the reference device as an orphan (224). Marking a device as an orphan does not necessarily mean that the device lacks a parent. It simply means that the algorithm 200 was unable to place with a degree of confidence the device under consideration in the hierarchy. These devices are called orphans herein for convenience, to differentiate them from non-orphans (devices to which a parent was found to be linked). Such unaccounted-for devices can be manually placed by the user as described below.

Once all devices for a given feeder or level of the hierarchy have been placed or otherwise evaluated, the one or more controllers 110 determine whether there are additional monitoring devices in the non-orphaned set to be evaluated (230). If there are still additional monitoring devices to be placed into the hierarchy, the one or more controllers 110 remove any placed devices from the non-orphaned set to be evaluated (228), and designate the next highest-ranked device in the non-orphaned set as the next reference monitoring device (214), and iterates to find the parent for that reference monitoring device.

Once all devices in the non-orphaned set have been evaluated and either placed or not placed in the hierarchy, the hierarchy is deemed to be complete (232). A representation of the hierarchy 122 is stored in the one or more memory devices 112, where the representation indicates how the monitoring devices are related to each other spatially in the utility monitoring system 102.

Figure 3:
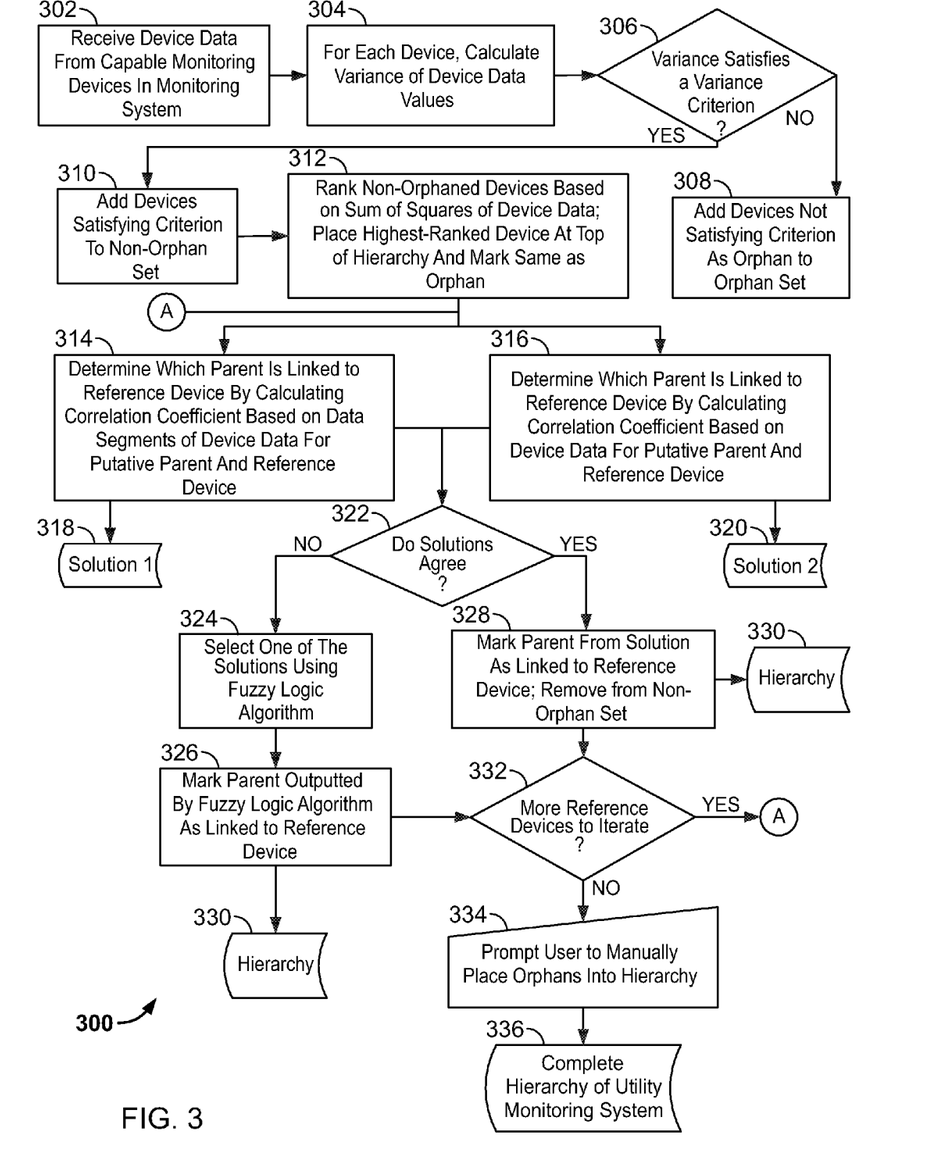
FIG. 3 is a flowchart of a hierarchy classification algorithm for automatically determining how the monitoring devices are linked together in the utility monitoring system according to another implementation of the aspects disclosed herein.

FIG. 3 is a flowchart of a hierarchy classification algorithm 300 for automatically determining how the monitoring devices 104 are spatially related in the utility monitoring system 102 according to another implementation of the aspects disclosed herein. The algorithm 300 exploits both the segmented and bulk approaches to provide a robust solution. The one or more controllers 110 receives, from each of the monitoring devices 104, respective device data 114 that includes values each indicative of a characteristic of a utility measured by the corresponding monitoring device (302). For each monitoring device 104, the one or more controllers 110 calculate a variance of the corresponding device data values as described above (304). If the variance calculated for a given monitoring device does not satisfy a variance criterion, such as exceeding a predetermined variance threshold (306), all such monitoring devices are added to an orphan set (308). Again, identifying a monitoring device as an orphan herein does not necessarily mean that it lacks a parent. In this example, the variance is too low to provide meaningful results, so the device is removed from consideration. It may have a parent in the hierarchy, but there is not a sufficient diversity of values in that device's characteristic device data to place it automatically in the hierarchy with a desired degree of confidence. Alternately, other characteristics measured by the device under consideration can be used to determine whether the device can be placed in the hierarchy. For example, there may not be sufficient diversity of data in a monitoring device's current data, but the voltage distortion data may have sufficient diversity to permit meaningful correlations.

If the variance calculated for the monitoring device under consideration does satisfy the variance criterion, the one or more controllers 110 add all such devices to a non-orphan set (310). The one or more controllers 110 rank the non-orphaned devices based on the sum of squares of their respective characteristic device data, as described above, and places the highest-ranked device at the top of the hierarchy and marks it as an orphan (312). For each set of characteristic device data, the one or more controllers 110 calculate the sum of squares of the device data to produce a sum of squares value indicative of the quantity of values in the device data. After ordering the non-orphaned devices from highest to lowest according to their sum of squares values, the one or more controllers 110 select a reference device and attempt to locate its parent using both segmented (314) and bulk (316) approaches described above. A first reference monitoring device is selected based on the order of the ranking (note, the highest ranked device is marked as an orphan, but is evaluated with the first reference monitoring device to ascertain whether the orphaned device is a parent of the reference monitoring device). On the left side of the flowchart, the one or more controllers 110 determine which parent is linked to the reference monitoring device by calculating a correlation coefficient based on the corresponding data segments of the device data for the reference monitoring device and another monitoring device having a higher rank than the reference monitoring device as determined at block 312 (314). This segmented algorithm produces a first solution 318 that indicates which other monitoring device (called a second monitoring device for terminological convenience, to differentiate it from the reference monitoring device) the reference monitoring device is linked to, as determined by computing the average of all of the segment correlation coefficients computed for each data segment of the device pair. In this example, this second possible parent device will be referred to as "Parent A." On the right side of the flowchart, the one or more controllers 110 determine which parent is linked to the reference device by calculating a correlation coefficient based on the entire (bulk) device data for another monitoring device having a higher rank than the reference monitoring device and the device data for the reference monitoring device (316). These higher-ranked monitoring devices may have been deemed to be orphans, but they are still evaluated to determine whether they are parents of any reference device under consideration. The bulk algorithm produces a second solution 320, which is a possible parent device that will be referred to as "Parent B." Parent A and Parent B may refer to the same monitoring device. The labels A and B are simply to differentiate that the parent was produced by different algorithms (segmented algorithm in the case of A and bulk algorithm in the case of B), not that they are necessarily different. In fact, the two solutions may agree (322), and if so, the parent from the solution (Parent A or Parent B) is marked as linked to the reference monitoring device and is removed from the non-orphaned set to be evaluated. The linked device pair is indicated in the hierarchy 330 that is being constructed and stored in the one or more memory devices 112 as the utility monitoring system hierarchy 122. The two determinations reflected in blocks 314 and 316 can be carried out in parallel by the one or more controllers 110 or one after the other.

If the first and second solutions 318, 320 do not agree (322), one of the solutions is selected using the fuzzy logic algorithm 120 described below in connection with FIG. 4 (324). The parent outputted by the fuzzy logic algorithm 120 (either Parent A or Parent B) is marked as being linked to the reference monitoring device, and the linked pair is indicated in the hierarchy 330 and stored in the hierarchy 122. The one or more controllers 110 can display an indication that the confidence of this solution is lower due to the disagreement of the bulk and segmented algorithms. The end-user can verify the solution and accept the solution or change it if it is incorrect.

The one or more controllers determine whether there are more reference devices to iterate (332). If so, the algorithm 300 loops back to point A and, using the next reference device, attempts to find its parent in the utility monitoring system 102. When all reference devices in the non-orphaned set have been evaluated and placed or not placed in the hierarchy 330 (332), the one or more controllers 110 prompt the user to manually place the orphans into the hierarchy 330 (334). This prompt can be conventionally displayed on a video display, and inputs from the user indicative of the manual placements can be received by any conventional input device, such as a mouse, keyboard, touchscreen, and the like. Alternately, the one or more controllers 110 can recommend a potential placement based on another characteristic besides the one used to determine whether the orphans can be placed in the hierarchy. With all of the orphaned and non-orphaned devices placed into the hierarchy, the complete hierarchy of the utility monitoring system 102 has been constructed (336), and it is stored in the one or more memory devices 112 as the hierarchy 122 for later retrieval and display to the user via a video display coupled to the one or more controllers 110.

Figure 4:
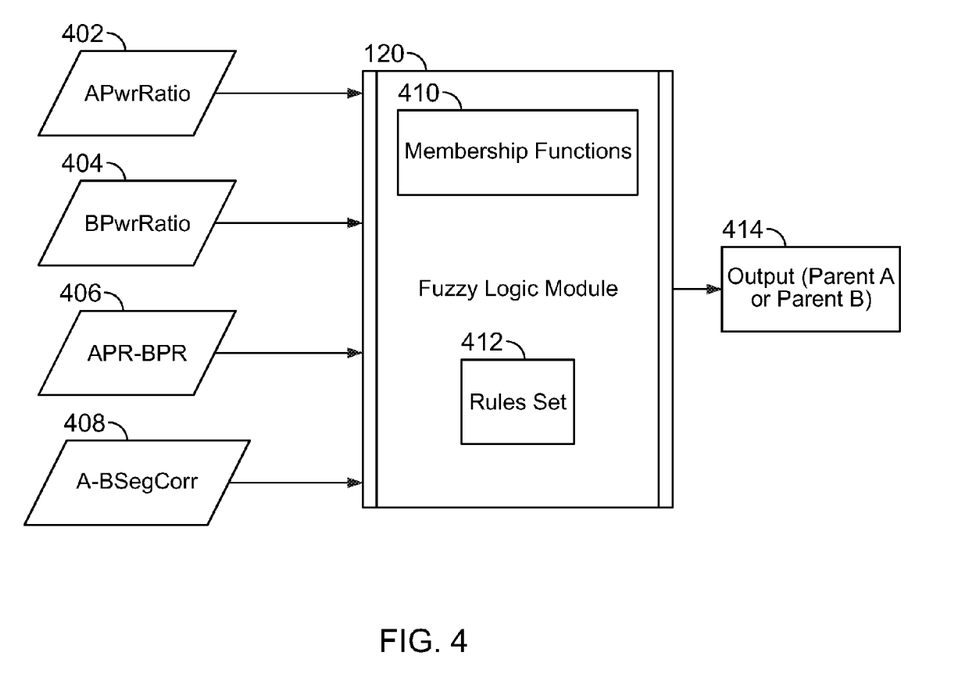
FIG. 4 is a functional block diagram of the fuzzy logic module shown in FIG. 1.

FIG. 4 is a functional block illustration of the fuzzy logic module or algorithm 120 shown in FIG. 1 and referenced in blocks 268 (FIG. 2D) and 326 (FIG. 3). The fuzzy logic module 120 conventionally includes inputs 402, 404, 406, 408, membership functions 410, and a set of rules 412. There are several problems that can arise in determining the hierarchy of a real-world utility monitoring system, including process (time of day and work pattern) correlation that can mask the desired load fluctuation correlations. As described above, the hierarchy classification algorithms disclosed herein work best with a diversity of fluctuations or variations in the characteristic being monitored. A second problem arises from variations in the accuracy of the monitoring devices 104 from one device to another due to different models and/or different manufacturers. Yet another problem is due to the diverse variability in the sizes of the loads being monitored in the utility monitoring system 102 by the monitoring devices 104. Some loads can vary slightly compared to other loads, and load changes associated with a small load may be masked by the data of the parent. It is very challenging to quantify and attach fixed thresholds to many of the variables due to the wide variation in conditions from one utility monitoring system to another.

A proposed method for addressing these ambiguous and diverse conditions is to use fuzzy logic. The fuzzy logic employed in this implementation determines the most likely parent for a child device from two possibilities after other non-fuzzy logic methodologies have been used to place as many devices in the hierarchy as possible. The fuzzy logic module 120 essentially breaks a tie between conflicting results of using correlation over the total or bulk device data set versus using the average correlation over the segmented data for a given device pair.

The problem is organized as follows in this example implementation. Two potential parents are labeled A and B, as described above. The device data from these two parent candidates are used to develop four inputs to the fuzzy logic module 120. The four inputs are used to form a set of eight rules 412 and a defuzzification process to pick A or B as the most probable parent. These inputs are labeled APwrRatio 402, BPwrRatio 404, APR-BPR 406, and A-BSegCorr 408. These inputs are described as follows, using power as the example characteristic monitored by the monitoring devices 104:

APwrRatio 402=ChildPavg/ParentAPavg, where ChildPavg represents the average power of the device data for the child monitoring device, here the reference monitoring device under consideration, and where ParentAPavg represents the average power of the device data for Parent A. The average power can be calculated, for example, by summing the power values in the device data and dividing by the total number of samples. APwrRatio thus represents the ratio between the child's average power and the average power associated with candidate Parent A.

BPwrRatio 404=ChildPavg/ParentBPavg, where ChildPavg represents the average power of the device data for the child monitoring device, here the reference monitoring device under consideration, and where ParentBPavg represents the average power of the device data for Parent B. BPwrRatio thus represents the ratio between the child's average power and the average power associated with candidate Parent B.

APR-BPR 406=APwrRatio 402−BPwrRatio 404.

A-BSegCorr 408=SegCorrChild:ParentA−SegCorrChild:ParentB, where SegCorrChild:ParentA represents the average of the segment correlation coefficients for the child-Parent A device pair combination. SegCorrChild:ParentA is computed by segmenting the device data for the child device (the reference monitoring device in this example) and the device data for Parent A into an equal number of data segments, and calculating, for each data segment, a segmented correlation coefficient, summing the segmented correlation coefficients for all of the data segments, then dividing by the number of data segments. Similarly, SegCorrChild:ParentB represents the average of the segment correlation coefficients for the child-Parent B device pair combination. A-BSegCor is the mathematical difference between SegCorrChild:ParentA and SegCorrChild:ParentB.

The inputs 402, 404 can be normalized so that their values are bounded between −1 to 1 or 0 to 1. The A-BSegCorr 408 input has a range from −100% to 100%.

The eight rules 412 are as follows (LOW, HIGH, NOT LOW, and NOT HIGH are defined in the membership functions 410):

1. If (APwrRatio is LOW) AND (BPwrRatio is HIGH), output 414=Parent A
2. If (APwrRatio is HIGH) AND (BPwrRatio is LOW), output 414=Parent B
3. If (A-BSegCor is A>B) AND (APwrRatio is NOT HIGH) AND (BPwrRatio is not LOW), output 414=Parent A
4. If (A-BSegCor is A<B) AND (APwrRatio is NOT LOW) AND (BPwrRatio is not HIGH), output 414=Parent B
5. If (APwrRatio is LOW) AND (BPwrRatio is LOW) AND (APR-BPR is APR<BPR), output 414=Parent A
6. If (APwrRatio is LOW) AND (BPwrRatio is LOW) AND (APR-BPR is APR>BPR), output 414=Parent B
7. If (A-BSegCor is A>B) AND (APwrRatio is HIGH) AND (BPwrRatio is HIGH), output 414=Parent A
8. If (A-BSegCor is A<B) AND (APwrRatio is HIGH) AND (BPwrRatio is HIGH), output 414=Parent B If the output is greater than 0.5, the parent is judged to be Parent B, and if the output is less than 0.5, the parent is judged to be Parent A. A value of 0.5 indicates that a decision could not be made, i.e., both Parents A and B are equally likely to be the parent of the child under consideration. Should this occur, the user can be informed that the child reference device under consideration cannot be placed, and the user can be prompted to place the child device manually into the hierarchy. The user is also informed of the two candidate parents, Parents A and B, to facilitate the user's placement of the child.

The membership functions 410 conventionally map the inputs 402, 404, 406, 408 to the output 414, and define the terms in the rules 412, e.g., defining what is LOW, HIGH, NOT LOW, and NOT HIGH.

It is emphasized that the inputs and rules can be varied myriad ways. The example disclosed herein is one of many implementations that can be designed to select one of two conflicting candidate parents. Devices that are placed using the fuzzy logic module 120 can be highlighted when the hierarchy is displayed to the user to alert the user that these devices were placed with disagreement between the bulk and segmented approaches.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. A method of automatically determining how a plurality of monitoring devices are linked together in a utility monitoring system, comprising:
    receiving from each of the monitoring devices respective device data that includes a plurality of values that are indicative of a characteristic of a utility measured by and stored on the corresponding monitoring device;
    calculating, using one or more controllers, a first variance of the values received from a reference one of the monitoring devices;
    calculating, using the one or more controllers, a second variance of the values received from a second of the monitoring devices;
    responsive to the first variance or the second variance not satisfying a variance criterion, storing on one or more memory devices an indication that the corresponding monitoring device is an orphan, wherein the variance criterion includes whether the first variance or the second variance exceeds a predetermined variance threshold;
    responsive to the first variance or the second variance satisfying the variance criterion, including the corresponding monitoring device in a set of non-orphaned monitoring devices;
    responsive to the reference monitoring device and the second monitoring device being in the set of non-orphaned monitoring devices, segmenting, using the one or more controllers, the respective device data for the reference monitoring device and for the second monitoring device into a corresponding plurality of data segments;
    calculating, using the one or more controllers, a correlation coefficient based on the data segments associated with the reference monitoring device and based on the corresponding data segments associated with the second monitoring device; and
    responsive to the correlation coefficient satisfying a correlation criterion, storing an indication on the one or more memory devices that the reference monitoring device is linked to the second monitoring device in the utility monitoring system.

2. The method of claim 1, further comprising:
    ranking, using the one or more controllers, each of the non-orphaned monitoring devices in a predetermined order from a highest rank to a lowest rank starting with a top-ranked one of the non-orphaned monitoring devices; and
    determining, using the one or more controllers, a top-ranked device of the non-orphaned monitoring devices based on the values measured by the monitoring devices.

3. The method of claim 2, wherein the ranking the non-orphaned monitoring devices includes:
    calculating, using the one or more controllers, the sum of squares of the device data for each of the non-orphaned monitoring devices; and
    ordering the non-orphaned monitoring devices based on the sum of squares from highest to lowest to produce the predetermined order.

4. The method of claim 1, wherein the calculating the correlation coefficient includes:
for each of the data segments, calculating a segment correlation coefficient based on each of the data segments associated with the reference monitoring device and each of the corresponding data segments associated with the second monitoring device, to produce a plurality of segment correlation coefficients; and
calculating an average of the segment correlation coefficients to produce the correlation coefficient.

5. The method of claim 1, wherein the correlation criterion includes whether the correlation coefficient exceeds a predetermined correlation threshold.

6. The method of claim 1, wherein the storing the indication is carried out responsive to the correlation coefficient satisfying the correlation criterion and responsive to determining that linking the reference monitoring device with the second monitoring device does not violate a law of conservation of energy.

7. The method of claim 6, wherein the determining whether the law of conservation of energy is violated includes determining that the law of conservation of energy is violated responsive to the reference device consuming more energy than the second device.

8. The method of claim 1, wherein the storing the indication is carried out responsive to the correlation coefficient satisfying the correlation criterion and responsive to resolving a conflict between the second monitoring device and a third monitoring device determined as also being linked to the reference monitoring device by:
calculating a second correlation coefficient based on the device data associated with the reference device and the device data associated with the third monitoring device;
responsive to the second correlation coefficient exceeding a second predetermined threshold, storing an indication that the reference monitoring device and the third monitoring device are linked.

9. The method of claim 8, wherein the resolving the conflict is carried out by a fuzzy logic algorithm that includes a set of inputs and a set of rules.

10. The method of claim 9, wherein the set of rules includes a first segment correlation coefficient associated with the segment data for the reference monitoring device and the segment data for the second monitoring device, a second segment correlation coefficient associated with the segment data for the reference monitoring device and the segment data for the third monitoring device, an average of the values of the device data for the reference monitoring device, an average of the values of the device data for the second monitoring device, and an average of the values of the device data for the third monitoring device.

11. The method of claim 10, wherein the set of rules includes a first ratio between the average of the values of the device data for the reference monitoring device and the average of the values of the device data for the second monitoring device, the set of rules further including a second ratio between the average of the values of the device data for the reference monitoring device and the average of the values of the device data for the third monitoring device.

12. The method of claim 11, wherein the set of rules includes a difference between the first ratio and the second ratio.

13. The method of claim 10, wherein the set of rules includes a difference between the first segment correlation coefficient and the second segment correlation coefficient.

14. The method of claim 9, wherein the set of inputs includes a first input that is based on the first segment correlation coefficient and the second segment correlation coefficient, a second input that is based on the average of the values of the device data for the reference monitoring device and the average of the values of the device data for the second monitoring device, a third input that is based on the average of the values of the device data for the reference monitoring device and the average of the values of the device data for the third monitoring device.

15. The method of claim 1, wherein the indication includes an indication that the reference monitoring device is linked as a child to the second monitoring device in the utility monitoring system.

16. The method of claim 1, responsive to the first variance or the second variance not satisfying the variance criterion, displaying on a video display a prompt to indicate which one or more of the plurality of monitoring devices the orphan is linked to in the utility monitoring system.

17. The method of claim 1, wherein the utility is electricity, and the utility monitoring system is a power monitoring system, and wherein the characteristic includes current, voltage, or power.

18. A method of automatically determining how a plurality of monitoring devices are linked together in a utility monitoring system, comprising:
receiving from each of the monitoring devices respective device data that includes a plurality of values each indicative of a characteristic of a utility measured by and stored on the corresponding monitoring device;
for each of the device data, calculating, using one or more controllers, a variance of the values received from the corresponding monitoring device;
responsive to the variance not satisfying a variance criterion, including the corresponding monitoring device as an orphan in a set of orphaned monitoring devices;
responsive to the variance satisfying the variance criterion, including the corresponding monitoring device in a set of non-orphaned monitoring devices;
ranking, using the one or more controllers, each of the non-orphaned monitoring devices in a predetermined order from a highest rank to a lowest rank starting with a top-ranked one of the non-orphaned monitoring devices;
for a reference one the non-orphaned monitoring devices, determining whether a second one of the monitoring devices is linked to the reference monitoring device by:
segmenting the device data of the reference monitoring device into a first plurality of data segments,
segmenting the device data of the second monitoring device into a second plurality of data segments,
calculating a first correlation coefficient based on the first data segments and the second data segments,
responsive to the first correlation coefficient satisfying a first criterion, indicating, as a first solution, that the reference monitoring device and the second monitoring device are linked;
for the reference monitoring device, determining whether the second monitoring device is linked to the reference monitoring device by:
calculating a second correlation coefficient based on the device data of the reference monitoring device and the device data of the second monitoring device, and
responsive to the second correlation coefficient satisfying a second criterion, indicating, as a second solution, that the reference monitoring device and the second monitoring device are linked;

responsive to the first solution being different from the second solution, selecting one of the solutions using a fuzzy logic algorithm; and responsive to the selecting, storing an indication which of the monitoring devices the reference monitoring device is linked to in the utility monitoring system.

19. The method of claim 18, wherein the utility is electricity, and the utility monitoring system is a power monitoring system, and wherein the characteristic includes current, voltage, or power.

20. A method of automatically determining how a plurality of monitoring devices are linked together in a utility monitoring system, comprising:

receiving from each of the monitoring devices respective device data that includes a plurality of values that are indicative of a characteristic of a utility measured by and stored on the corresponding monitoring device;

calculating, using one or more controllers, a first variance of the values received from a reference one of the monitoring devices;

calculating, using the one or more controllers, a second variance of the values received from a second of the monitoring devices;

responsive to the first variance or the second variance not satisfying a variance criterion, storing on one or more memory devices an indication that the corresponding monitoring device is an orphan;

responsive to the first variance or the second variance satisfying the variance criterion, including the corresponding monitoring device in a set of non-orphaned monitoring devices;

responsive to the reference monitoring device and the second monitoring device being in the set of non-orphaned monitoring devices, segmenting, using the one or more controllers, the respective device data for the reference monitoring device and for the second monitoring device into a corresponding plurality of data segments;

calculating, using the one or more controllers, a correlation coefficient based on the data segments associated with the reference monitoring device and based on the corresponding data segments associated with the second monitoring device; and responsive to the correlation coefficient satisfying a correlation criterion, storing an indication on the one or more memory devices that the reference monitoring device is linked to the second monitoring device in the utility monitoring system wherein the indication includes an indication that the reference monitoring device is linked as a child to the second monitoring device in the utility monitoring system.

* * * * *